United States Patent
Ramachandran et al.

(10) Patent No.: US 11,114,876 B2
(45) Date of Patent: Sep. 7, 2021

(54) BATTERY SAFETY MECHANISM FOR BATTERY FAULT CONDITIONS

(71) Applicant: TEXAS INSTRUMENTS INCORPORATED, Dallas, TX (US)

(72) Inventors: Gautham Ramachandran, Allen, TX (US); Mustapha El Markhi, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 14 days.

(21) Appl. No.: 16/559,860

(22) Filed: Sep. 4, 2019

(65) Prior Publication Data

US 2020/0266647 A1 Aug. 20, 2020

Related U.S. Application Data

(60) Provisional application No. 62/807,151, filed on Feb. 18, 2019.

(51) Int. Cl.
*H02J 7/00* (2006.01)
*H01M 10/44* (2006.01)

(52) U.S. Cl.
CPC .......... *H02J 7/0063* (2013.01); *H01M 10/44* (2013.01); *H02J 7/0031* (2013.01); *H02J 7/0068* (2013.01); *H02J 2207/20* (2020.01)

(58) Field of Classification Search
CPC .... H02J 7/0063; H02J 7/0031; H02J 2207/20; H01M 10/44
USPC ........................................................ 307/48
See application file for complete search history.

(56) References Cited

U.S. PATENT DOCUMENTS 6,734,652 B1 * 5/2004 Smith ................... H02J 7/0029
320/163

OTHER PUBLICATIONS

Qian, Jinrong. "Li-ion battery-charger solutions for JEITA compliance." Power Management. High-Performance Analog Products. 1Q 2010. Analog Applications Journal. Texas Instruments Incorporated. 6 pages.
"A Guide to the Safe Use of Secondary Lithium Ion Batteries in Notebook-type Personal Computers." Japan Electronics and Information Technology Industries Association and Battery Association of Japan. Apr. 20, 2007. 18 pages.
"LM2576,LM3420,LP2951,LP2952." Battery Charging. Literature No. SNVA557. Texas Instruments. 19 pages.

(Continued)

*Primary Examiner* — Hal Kaplan
(74) *Attorney, Agent, or Firm* — Mark Allen Valetti; Charles A. Brill; Frank D. Cimino

(57) ABSTRACT

A battery charger circuit associated with a portable electronic device is disclosed. The battery charger circuit comprises a charging circuit configured to charge a battery and a discharging circuit configured to discharge the battery. The battery charger circuit further comprises a battery fault detection circuit configured to detect a battery fault condition, based on monitoring one or more battery parameters. In some aspects, the battery charger circuit further comprises a battery charge control circuit configured to selectively activate the discharging circuit, in order to discharge the battery, and deactivate the charging circuit, in order to suspend charging the battery during the discharge of the battery, when the battery fault condition is detected.

23 Claims, 7 Drawing Sheets

(56) References Cited

OTHER PUBLICATIONS

"BQ25150 500-mA Linear charger with 10-nA ship mode, advanced power path management and control, ADC, and LDO." SLUSD04B—Jul. 2018—Revised Feb. 2019. BQ25150. Texas Instruments. 54 pages, part 1.

"BQ25150 500-mA Linear charger with 10-nA ship mode, advanced power path management and control, ADC, and LDO." SLUSD04B—Jul. 2018—Revised Feb. 2019. BQ25150. Texas Instruments. 54 pages, part 2.

"BU-409: Charging Lithium-ion." Charging Lithium-Ion Batteris—Battery University. https://batteryuniversity.com/learn/article/charging_lithium_ion_batteries. 90 pages.

What is battery life—Definition from WhatIs.com? https://whatis.techtarget.com/definition/battery-life. Aug. 2013. 3 pages.

"Lithium-ion battery." Wikipedia. https://en.wikipedia.org/wiki/Lithium-ion_battery. 50 pages.

A Designer's Guide to Lithium (Li-ion) Battery Charging. Sep. 1, 2016. DigiKey. https://www.digikey.com/en/articles/techzone/2016/sep/a-designer-guide-fast-lithium-ion-battery-charging. 8 pages.

\* cited by examiner

BATTERY SAFETY MECHANISM FOR BATTERY FAULT CONDITIONS

CROSS-REFERENCE TO RELATED APPLICATIONS

This application claims the benefit of and priority to U.S. Provisional Application No. 62/807,151, filed Feb. 18, 2019, entitled "Apparatus with Battery Safety Mechanism for Detecting Fault Battery Conditions," the contents of which are herein incorporated by reference in their entirety.

TECHNICAL FIELD

The present disclosure relates to portable electronic devices, and in particular, to systems and methods to discharge a battery in response to detection of a battery fault condition.

BACKGROUND

Portable electronic devices are expected to use a single rechargeable battery for months or even years before the rechargeable battery needs to be replaced (in some instances, the rechargeable battery may never be replaced during the lifetime of the device), making rechargeable battery lifetime a top priority for product designers. Many portable electronic devices are expected to operate over a wide temperature range during their lifetime. High temperature conditions can adversely affect rechargeable battery lifetime and performance. In particular, exposing a rechargeable battery to a high temperature/low temperature condition may present safety risks (e.g., increased risk of catastrophic events) or reduced life cycle (e.g., reduced number of charge/discharge cycles for the rechargeable battery).

BRIEF DESCRIPTION OF THE DRAWINGS

Some examples of circuits, apparatuses and/or methods will be described in the following by way of example only. In this context, reference will be made to the accompanying figures.

SUMMARY

Figure 1:
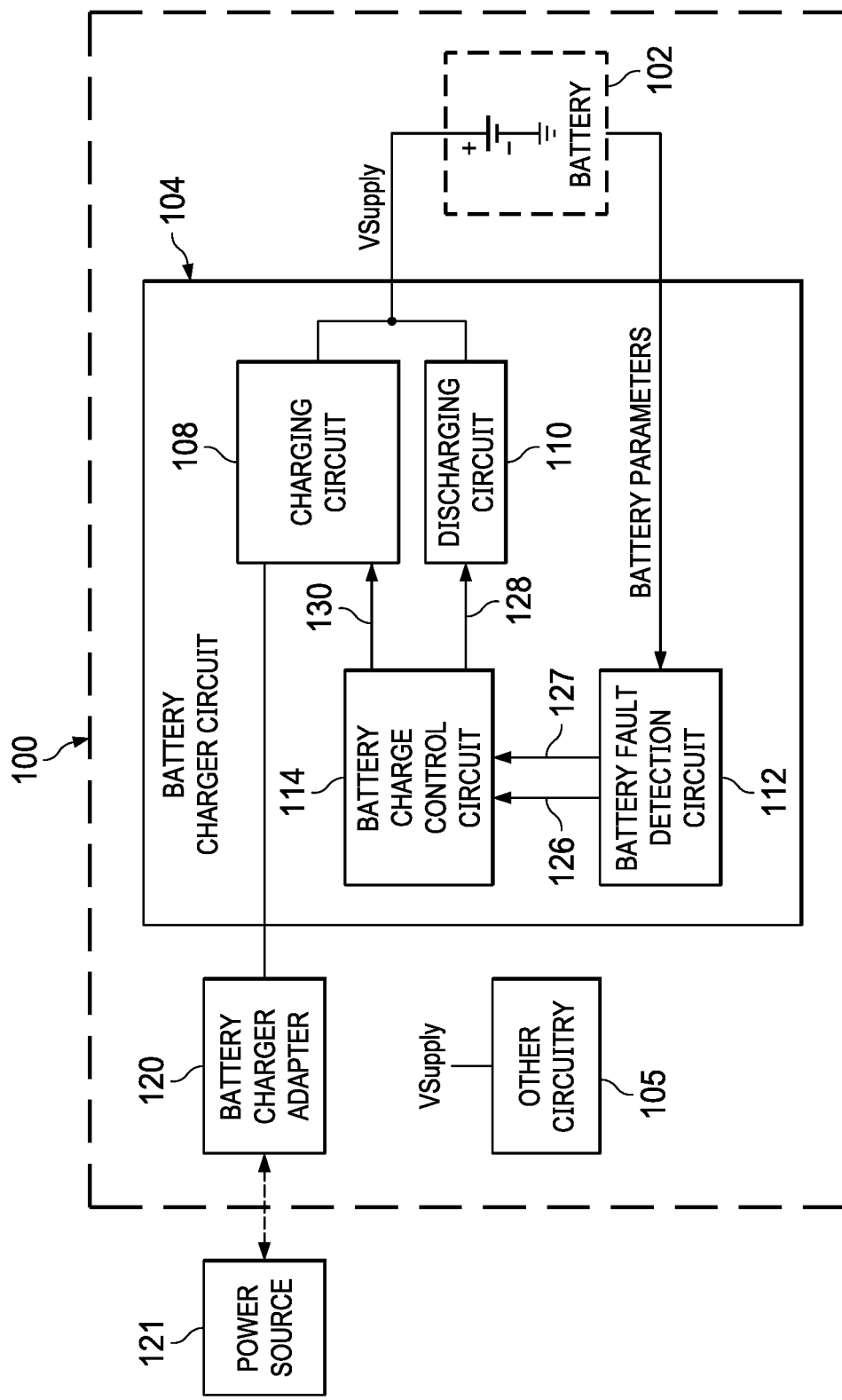
FIG. 1 illustrates a simplified block diagram of a portable electronic device, according to one aspect of the disclosure.

The following presents a simplified summary in order to provide a basic understanding of one or more aspects of the disclosure. This summary is not an extensive overview of the disclosure, and is neither intended to identify key or critical elements of the disclosure, nor to delineate the scope thereof. Rather, the primary purpose of the summary is to present some concepts of the disclosure in a simplified form as a prelude to a more detailed description that is presented later.

In one aspect of the disclosure, a battery charger circuit is disclosed. The battery charger circuit comprises a charging circuit configured to charge a battery and a discharging circuit configured to discharge the battery. In some aspects, the battery charger circuit further comprises a battery fault detection circuit configured to determine a battery fault condition, based on monitoring one or more battery parameters. In addition, the battery charger circuit further comprises a battery charge control circuit configured to selectively activate the discharging circuit, in order to discharge the battery, and deactivate the charging circuit, in order to suspend charging the battery during the discharge of the battery, when the battery fault condition is determined.

In one aspect of the disclosure, a portable electronic device is disclosed. The portable electronic device comprises a battery and a battery charger circuit. In some aspects, the battery charger circuit comprises a charging circuit configured to charge the battery, wherein the charging circuit comprises a pull-up transistor having a first source/drain coupled to a battery charger adapter port and a second source/drain coupled to the battery. In some aspects, the battery charger circuit further comprises a discharging circuit configured to discharge the battery, wherein the discharging circuit comprises a pull-down transistor having a first source/drain coupled to the battery and a second source/drain coupled to a circuit ground. Further, the battery charger circuit comprises a battery fault detection circuit configured to detect a battery fault condition of the battery, based on monitoring a battery voltage and a battery temperature associated with the battery; and a battery charge control circuit configured to selectively discharge the battery via the discharging circuit, based on whether the battery fault condition is detected.

In one aspect of the disclosure, a method for controlling a charge level of a battery is disclosed. The method comprises using a charging circuit to charge the battery at a first temperature to a first charge level and after the battery has been charged to the first charge level, using a battery monitoring circuit to measure a second charge level of the battery and a temperature associated therewith as a second temperature. The method further comprises using a fault determination circuit to make a determination whether the second charge level is greater than a first charge level threshold and whether the second temperature is greater than or equal to a first temperature threshold; and based on the determination, using a discharging circuit to selectively discharge the battery while charging of the battery is suspended.

DETAILED DESCRIPTION

The present disclosure is described with reference to the attached figures. The figures are not drawn to scale and they are provided merely to illustrate the disclosure. Several aspects of the disclosure are described below with reference to example applications for illustration. Numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

As indicated above, high temperature conditions can adversely affect rechargeable batteries in portable electronic devices. For example, exposing a fully charged battery to a high temperature condition (e.g., 45° C.-60° C.) can pose an increased risk of catastrophic events and/or can shorten the lifetime of the rechargeable battery. Because of this, some portable electronic devices may be shipped to customers with batteries that are less than fully charged (e.g., charged to a safe voltage threshold). This safe voltage threshold is less than a fully charged battery voltage the rechargeable battery is capable of storing, such that this rechargeable battery is more tolerant of high temperature conditions than a rechargeable battery which has been charged to the fully charged battery voltage. Thus, even if this rechargeable battery encounters a high temperature condition during shipping, the fact that this rechargeable battery is charged to the safe voltage threshold (and not the fully charged battery voltage) tends to reduce safety risks and preserve the lifetime of this rechargeable battery.

While this approach may reduce the risk of fire and lengthen the lifetime of the battery, it is less practical for day-to-day use by a consumer who owns the portable electronic device, as the consumer desires the battery be charged to its fully charged state to extend device usage between battery charging operations. Nonetheless, because the consumer may unwittingly expose the portable electronic device and its fully charged battery to a high temperature condition (e.g., leave the portable device with a fully charged battery in a hot car), it is still potentially detrimental to fully charge the battery. Previous implementations do not have a fast or efficient way to adequately address these situations, and therefore fully charged batteries can pose safety risks and/or can reduce battery life for the consumer.

In order to overcome the above disadvantages, this disclosure provides a portable electronic device comprising a battery charger circuit. The battery charger circuit is configured to determine a fault condition associated with a battery by monitoring one or more battery parameters of the battery. The battery charger circuit is configured to discharge the battery when the battery fault condition is determined. For example, in some examples, the one or more battery parameters comprise a battery voltage and a battery temperature; and if the battery voltage is more than a predefined safe voltage threshold and the battery temperature is more than a predefined temperature threshold, then the battery charger circuit can selectively activate a discharging circuit to reduce the battery voltage to the predefined safe voltage threshold. In this way, if a high temperature condition is applied to a fully charged battery, the battery charger circuit can discharge the battery to a predefined safe voltage to reduce the risk of fire and to extend the battery's lifetime (e.g., number of charge/discharge cycles for the battery). Further, in some aspects, the battery charger circuit is implemented on a semiconductor substrate as a hardware block comprising one or more fault threshold comparator circuits configured to monitor the one or more battery parameters. Implementing the battery charger circuit as a hardware block allows the determination of the battery fault condition to be offloaded from a host of the portable electronic device to the battery charger circuit, and therefore frees the host for other tasks to thereby enhance the overall performance of the portable electronic device.

FIG. 1 illustrates a simplified block diagram of a portable electronic device 100, according to some aspects of the disclosure. In some aspects, portable electronic device 100 may be included as part of or may correspond to an electronic device such a laptop, smart watch, fitness tracker, smart phone, etc. The portable electronic device 100 comprises a battery 102, a battery charger circuit 104, and other circuitry 105 powered by the battery 102. For example, the other circuitry 105 can include microprocessor(s), memory (s), device input(s) (e.g., touchscreen(s); push-button(s); microphone(s); digital data cable(s); wireline or wireless receiver(s)), and/or device output(s) (e.g., visual output(s), such as liquid-crystal-display screen(s); speaker(s); digital data cable(s); vibration mechanism(s); wireless or wireline transmitter(s)). When a battery charger adapter 120 is connected (e.g., "plugged-in" or wirelessly connected) to power source 121, the battery charger circuit 104 can charge the battery 102 via the battery charger adapter 120. When the battery charger adapter 120 is disconnected (e.g., "unplugged" or wirelessly disconnected), the user can use the portable electronic device 100 in a mobile fashion, wherein the battery 102 provides power to portable electronic device 100, including the battery 102, battery charger circuit 104, and other circuitry 105 without the battery charger adapter 120 being connected to the power source 121.

To allow selective charging and discharging of the battery 102, the battery charger circuit 104 includes a charging circuit 108, a discharging circuit 110, a battery fault detection circuit 112, and a battery charge control circuit 114. The battery fault detection circuit 112 is configured to monitor one or more battery parameters of the battery 102, and is configured to generate a battery fault condition 126 and a battery fault correction condition 127 indicative of a state of the battery 102. If the battery fault condition 126 is generated, the battery charge control circuit 114 can selectively activate the discharging circuit 110 via a discharge control signal 128 to thereby discharge the battery 102. Conversely, if the battery fault correction condition 127 is generated, the battery charge control circuit 114 can deactivate the discharging circuit 110 via discharge control signal 128, in order to stop discharging the battery 102 and can optionally activate the charging circuit 108 via charging control signal 130. In some aspects, beyond discharging the battery 102, the battery 102 may be completely isolated from supplying further loads, in order to protect the battery 102 during high temperature conditions.

For example, in some aspects, the battery fault detection circuit 112 can monitor battery parameters that include a battery voltage ($V_{BAT}$) and a battery temperature ($T_{BAT}$) of the battery 102. When the battery charger adapter 120 is connected to the power source 121, the battery charge control circuit 114 can enable the charging circuit 108 via charging control signal 130, thereby coupling the battery 102 to the battery charger adapter 120 and charging the battery 102. In this example, the one or more battery parameters comprises a battery voltage $V_{BAT}$ associated with the battery 302 and a battery temperature $T_{BAT}$ associated with the battery 102; however, other battery parameters of the battery 102, such as a current level, charge level, etc., are also contemplated to be within the scope of this disclosure and could be used to detect the battery fault condition and/or the battery fault correction condition. In particular, in some aspects, the battery fault detection circuit 112 may monitor a state of charge (SOC) of the battery 102 (e.g., the percentage of charge in the battery) and temperature, and selectively activate discharge based thereon (e.g., when the SOC>80% and temperature is high).

When the battery charger adapter 120 is disconnected from the power source 121, the battery 102 cannot be charged via the power source 121. Nonetheless, the battery fault detection circuit 112 continues to monitor the battery voltage and battery temperature. If the battery voltage ($V_{BAT}$) is greater than a predefined safe voltage threshold ($V_{TH}$) ($V_{TH}$ is less than the fully charged voltage capable of being stored in the battery 102), and the battery temperature ($T_{BAT}$) experienced by the battery 102 increases to more than a predefined temperature threshold ($T_{TH}$), the battery fault detection circuit 112 generates the battery fault condition 126. This battery fault condition 126 causes the battery charge control circuit 114 to enable the discharging circuit 110 via discharge control signal 128. The discharging circuit 110 then discharges the battery 102 until the battery voltage is less than the predefined safe voltage threshold. Thus, the battery charger circuit 104 can identify a battery fault condition and selectively discharge the battery based on the battery fault condition to limit risks of the battery 102 catching on fire and/or to increase the lifetime of the battery 102.

Further, after the battery fault condition 126 has been generated, if the battery temperature is determined to fall to less than the predefined temperature threshold and/or the battery voltage is determined to fall to less than or equal to the predefined safe voltage threshold, the battery fault detection circuit 112 can generate a battery fault correction condition 127, which deactivates the discharging circuit 110 via discharge control signal 128. Thus, when the battery fault correction condition 127 is generated, discharging of the battery 102 through the discharging circuit 110 stops, although the battery 102 can have sufficient power to operate the other circuitry 105 on the portable electronic device 100 in some cases. If the battery charger adapter 120 is connected when the battery fault correction signal 127 is generated, the battery 102 can be charged if the battery voltage is less than fully charged. Accordingly, in some embodiments, the battery voltage is managed to strike a balance between generally attempting to keep the battery voltage high, but also appreciating that discharging the battery in the wake of a battery fault condition, such as a high temperature condition where the battery voltage is more than a predefined threshold voltage, may be advantageous for safety and/or reliability reasons.

Figure 2:
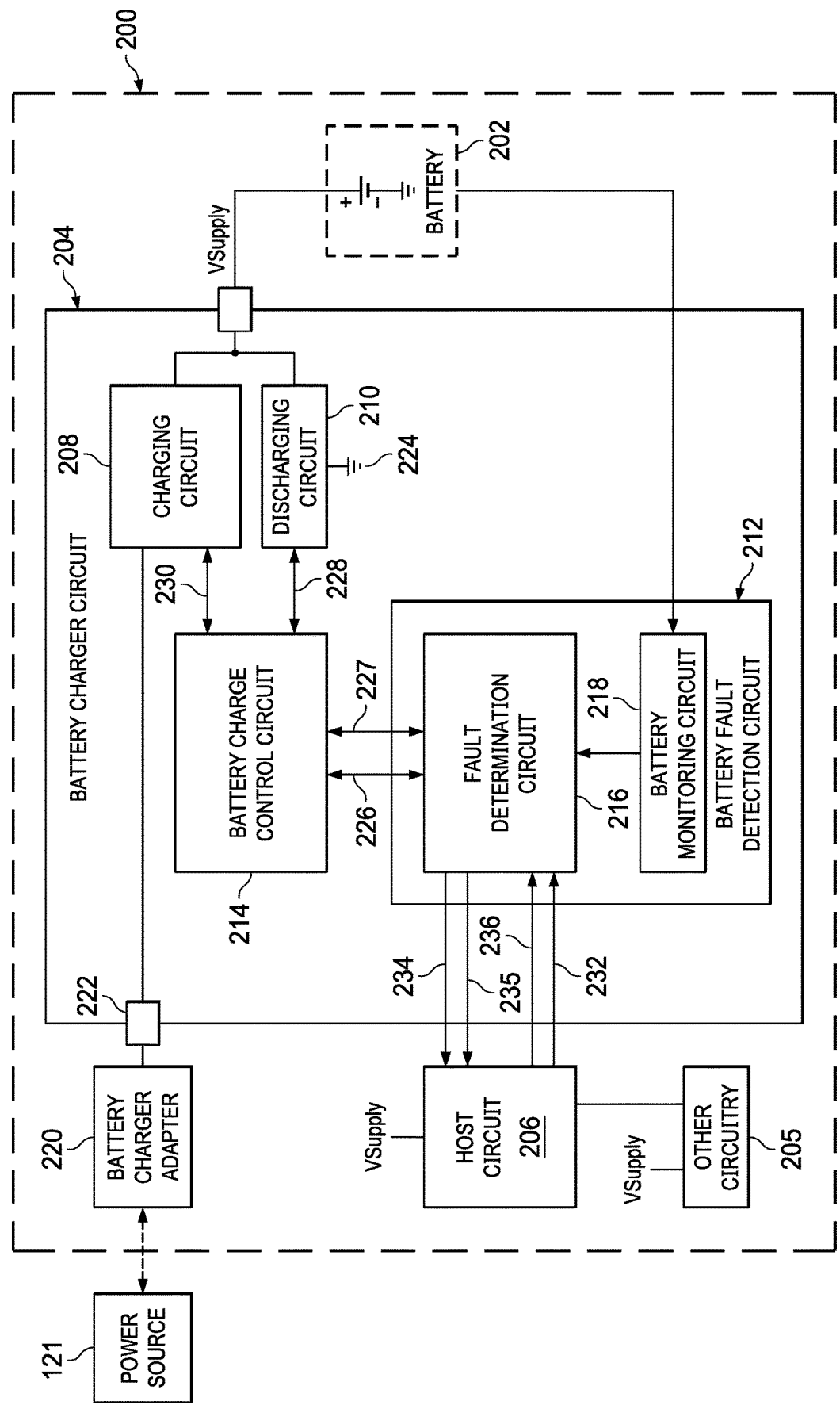
FIG. 2 illustrates an illustrative block diagram of a portable electronic device, according to one aspect of the disclosure.

FIG. 2 illustrates a simplified block diagram of a portable electronic device 200, according to one aspect of the disclosure. The portable electronic device 200 may comprise some aspects the portable electronic device 100 in FIG. 1 (and vice versa); and thus, the features explained above with regards to FIG. 1 are also applicable to the portable electronic device 200 in FIG. 2. In some aspects, the portable electronic device 200 comprises a battery 202, a battery charger circuit 204, other circuitry 205, and a host circuit 206. The battery 202 comprises a rechargeable battery configured to be charged based on whether a battery charger adapter 220 is connected to a power source 121. In some aspects, the battery 202 is coupled to the battery charger adapter 220 via the battery charger circuit 204. In some aspects, the battery charger circuit 204 may be implemented by an integrated circuit die.

The battery charger circuit 204 comprises a charging circuit 208 and a discharging circuit 210. In some aspects, the charging circuit 208 is configured to charge the battery 202 when the battery charger adapter 220 is coupled to the power source 121. In some aspects, the charging circuit 208 is coupled to the battery charger adapter 220 via a battery charger adapter port 222 associated with the battery charger circuit 204. In some aspects, the charging circuit 208 is coupled between the battery charger adapter port 222 and the battery 202. In some aspects, the charging circuit 208 may comprise a charging path comprising one or more switches.

In some aspects, the discharging circuit 210 is configured to discharge the battery 202. In some aspects, the discharging circuit 210 is coupled between the battery 202 and a circuit ground 224. In some aspects, the discharging circuit 210 may comprise a discharging path comprising one or more switches.

The battery charger circuit 204 further comprises a battery fault detection circuit 212 configured to detect a battery fault condition of the battery 202. In particular, in some aspects, the battery fault detection circuit 212 comprises a battery monitoring circuit 218 configured to monitor the one or more battery parameters of the battery 202 and a fault determination circuit 216 configured to determine whether the battery fault condition is present, based on the one or more battery parameters. In some aspects, the battery monitoring circuit 218 may comprise one or more fault threshold comparator circuits configured to respectively provide one or more fault threshold parameters, based on comparing a respective parameter associated with the battery to a respective predefined fault threshold. In some aspects, the one or more fault threshold parameters is indicative of the battery fault condition. In some aspects, the fault determination circuit 216 is configured to determine the battery fault condition, based on the one or more fault threshold parameters.

In some aspects, the one or more battery parameters comprises a voltage associated with the battery 202 and a temperature associated with the battery 202. However, other parameters, different from voltage and temperature, are also contemplated to be within the scope of this disclosure. In some aspects, the battery fault condition comprises a temperature associated with the battery being greater than a predefined fault temperature threshold and a voltage associated with the battery being greater than a predefined fault voltage threshold. In such aspects, the one or more fault threshold comparator circuits may comprise a voltage comparator circuit configured to determine whether the voltage associated with the battery is greater than the predefined fault voltage threshold, and provide a voltage fault threshold parameter, wherein the voltage fault threshold parameter is indicative of the determination. Further, the one or more fault threshold comparator circuits may comprise a temperature comparator circuit configured to determine whether the temperature associated with the battery is greater than the predefined fault temperature threshold, and provide a temperature fault threshold parameter based thereon, wherein the temperature fault threshold parameter is indicative of the determination. However, in other aspects, the battery fault condition may be defined differently.

The battery charger circuit 204 further comprises a battery charge control circuit 214 configured to selectively activate the discharging circuit 210, in order to discharge the battery 202, when the battery fault condition is determined at the fault determination circuit 216. In some aspects, the battery charge control circuit 214 is further configured to deactivate the charging circuit 208, when the battery fault condition is determined at the fault determination circuit 216. In some aspects, deactivating the charging circuit 208 enables to stop/suspend charging the battery 202 during the battery discharge, in case the battery charger adapter 220 is plugged in to the battery charger circuit 204. In some aspects, the battery fault detection circuit 212 is configured to determine the battery fault condition of the battery 202 and the battery charge control circuit 214 is configured to selectively activate the discharging circuit 210, in order to discharge the battery 202, when the battery charger adapter 220 is disconnected from the battery charger circuit 204. However, in other aspects, the battery fault detection circuit 212 is configured to determine the battery fault condition of the battery 202 and the battery charge control circuit 214 is configured to selectively activate the discharging circuit 210, in order to discharge the battery 202, when the battery charger adapter 220 is connected to the battery charger circuit 204 (e.g., the battery 202 is charging). In some aspects, the battery charge control circuit 214 is configured to activate the discharging circuit 210, based on a discharge control signal 228, when the battery fault condition is determined at the fault determination circuit 216. Further, the battery charge control circuit 214 is configured to deactivate the charging circuit 208, based on a charge control signal 230, when the battery fault condition of the battery 202 is determined at the fault determination circuit 216.

In some aspects, the battery charge control circuit 214 is configured to selectively activate the discharging circuit 210 and deactivate the charging circuit 208, based on receiving a fault indication signal 226 from the fault determination circuit 216. In some aspects, the fault determination circuit 216 is further configured to generate the fault indication signal 226 and provide the fault indication signal 226 to the battery charge control circuit 214. In some aspects, the fault determination circuit 216 is configured to generate the fault indication signal 226, based on receiving a discharge activation signal 232 from the host circuit 206. In some aspects, the host circuit 206 comprises a microcontroller (MCU). In some aspects, the host circuit 206 and the battery charger circuit 204 may be on the same chip or integrated circuit (IC). However, in other aspects, both the host circuit 206 and the battery charger circuit 204 may be on separate chips or integrated circuits (ICs). In some aspects, upon determining the battery fault condition (and prior to generating the fault indication signal 226), the fault determination circuit 216 is configured to provide a fault detection interrupt signal 234 to the host circuit 206. In some aspects, the fault detection interrupt signal 234 is indicative of the battery fault condition. Upon receiving the fault detection interrupt signal 234, the host circuit 206 is configured to generate the discharge activation signal 232, based on a predefined battery charge control algorithm, further details of which are given in an embodiment below.

Upon activating the discharging circuit 210, in some aspects, the battery fault detection circuit 212 is further configured to determine a fault correction condition indicative of a correction of the battery fault condition of the battery 202, based on monitoring one or more battery parameters of the battery 202. In some embodiments, the battery monitoring circuit 218 further comprises one or more fault correction comparator circuits configured to respectively provide one or more fault correction threshold parameters, based on comparing a respective parameter associated with the battery to a respective predefined fault correction threshold. In some aspects, the one or more fault correction threshold parameters is indicative of the battery fault correction condition. In some aspects, the fault determination circuit 216 is configured to determine the battery fault correction condition, based on the one or more fault correction threshold parameters.

In some aspects, the battery fault correction condition associated with the battery 202 comprises the voltage associated with the battery 202 being less than a predefined safe voltage threshold. In some embodiments, the predefined safe voltage threshold is same as the predefined fault voltage threshold defined to determine the battery fault condition. However, in other aspects, the predefined safe voltage threshold and the predefined fault voltage threshold may be different (e.g., the predefined safe voltage threshold is less than the predefined fault voltage threshold). In such aspects, the one or more fault correction comparator circuits comprises a voltage correction comparator circuit configured to determine whether the voltage associated with the battery 202 is less than the predefined safe voltage threshold and provide a voltage correction threshold parameter based thereon. In some aspects, the voltage correction threshold parameter is indicative of the determination. The battery fault correction condition, however, may be defined differently in different aspects.

In some aspects, the battery charge control circuit 214 is further configured to deactivate the discharging circuit 210, in order to stop discharging the battery, when the battery fault correction condition associated with the battery 202 is determined at the fault determination circuit 216. In some aspects, the battery charge control circuit 214 is further configured to reactivate the charging circuit 208, in order to enable charging the battery 202, when the battery fault correction condition associated with the battery is determined at the fault determination circuit 216. In some aspects, the battery charge control circuit 214 is configured to deactivate the discharging circuit 210, based on the discharge control signal 228. Further, the battery charge control circuit 214 is configured to reactivate the charging circuit 208, based on the charge control signal 230. In some aspects, the battery charge control circuit 214 may not reactivate the charging circuit 208 simultaneously with deactivating the discharging circuit 210. In some aspects, the battery charge control circuit 214 may be configured to reactivate the charging circuit 208, when the fault correction condition and an additional charging reactivate condition is determined at the fault determination circuit 216. In this example, the charge reactivate condition may comprise the temperature associated with the battery 202 being less than the predefined fault temperature threshold (i.e., $V_{TS} > V_{TSWarm}$). Therefore, in such aspects, the battery 202 may not be recharged until the charge reactivate condition is met, even after the fault correction condition is determined. In such aspects, the battery monitoring circuit 218 may include one or more additional comparator circuits, in order to determine the charge reactivate condition.

In some aspects, the battery charge control circuit 214 is configured to deactivate the discharging circuit 210, based on receiving a fault correction indication signal 227 from the fault determination circuit 216. In some aspects, the fault determination circuit 216 is further configured to generate the fault correction indication signal 227 and provide the fault correction indication signal 227 to the battery charge control circuit 214. In some aspects, the fault determination circuit 216 is configured to generate the fault correction indication signal 227, based on receiving a discharge deactivation signal 236 from the host circuit 206. In some aspects, upon determining the battery fault correction condition (and prior to generating the fault correction indication signal 227), the fault determination circuit 216 is configured to provide a fault correction interrupt signal 235 to the host circuit 206. In some aspects, the fault correction interrupt signal 235 is indicative of the battery fault correction condition. Upon receiving the fault correction interrupt signal 235, the host circuit 206 is configured to generate the discharge deactivation signal 236, based on the predefined battery charge control algorithm, further details of which are given in an embodiment below.

In some aspects, instantiating the battery monitoring circuit 218 in hardware, and using one or more interrupts (e.g., fault detection interrupt signal 234 and/or fault correction interrupt signal 235) to notify the host circuit 206 that a battery fault condition and/or a battery fault correction condition has been detected is advantageous in that it offloads many aspects of monitoring the battery 202 from the host circuit 206. Therefore, the host circuit 206 can be freed up for other tasks, while the battery charger circuit 204 in large part manages charging and discharging of the battery 202.

In some examples the battery 202 comprises a lithium ion battery, however, other types of rechargeable battery are also contemplated to be within the scope of this disclosure. Further, in some aspects, the battery 202 may comprise super capacitors, ultra-capacitors etc., and is not to be construed to be limited to conventional rechargeable batteries. In some aspects, the super capacitor comprises a high-capacity capacitor with a capacitance value much higher than other capacitors, but with lower voltage limits, that bridges the gap between electrolytic capacitors and rechargeable batteries. Super capacitors typically stores 10 to 100 times more energy per unit volume or mass than electrolytic capacitors, can accept and deliver charge much faster than batteries, and tolerates many more charge and discharge cycles than rechargeable batteries.

Figure 3:
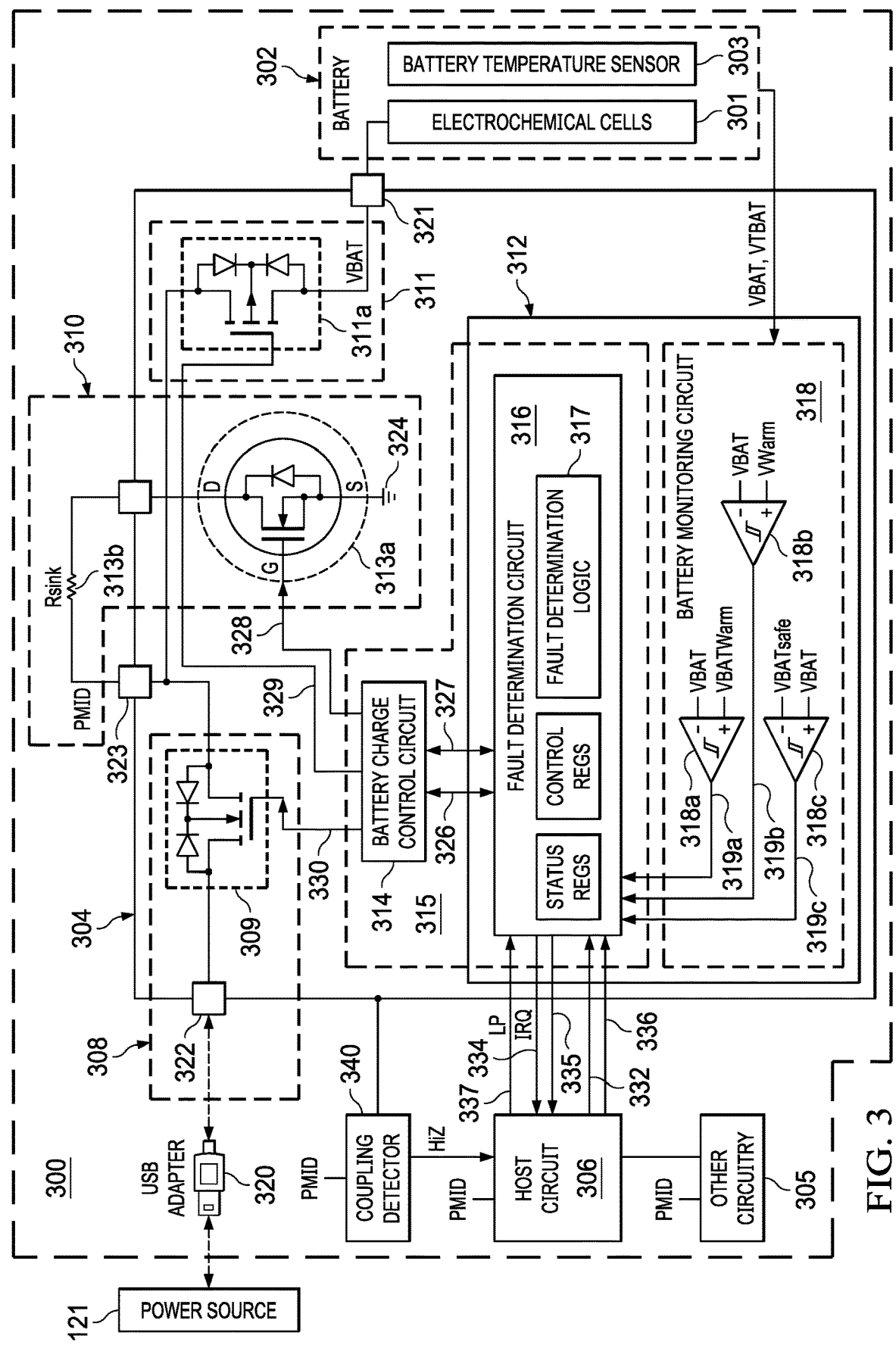
FIG. 3 illustrates an example implementation of a portable electronic device, according to one aspect of the disclosure.

FIG. 3 illustrates an example implementation of a portable electronic device 300, according to one aspect of the disclosure. The portable electronic device 300 may comprise some aspects of the portable electronic device 100 in FIG. 1 and/or the portable electronic device 200 in FIG. 2 (and vice versa); and thus, the features explained above with regards to FIG. 1 and FIG. 2 can also be applicable to the portable electronic device 300 in FIG. 3. For example, the portable electronic device 300 comprises a battery 302, a battery charger circuit 304, other circuitry 305, and a host circuit 306, as well as other features explained above that can also be applicable to the portable electronic device 300 in FIG. 3.

In some aspects, the battery 302 includes one or more electrochemical cells 301 and a battery temperature sensor 303 that are arranged within a battery package. The electrochemical cells 301 convert stored chemical energy to electrical energy that can be used by the portable electronic device 300. The battery temperature sensor 303 measures a battery temperature associated with the electrochemical cells 301, and provides a battery temperature signal in analog or digital format to the battery charger circuit 304. In some examples the battery 302 is a lithium ion battery, however, other types of rechargeable battery are also contemplated to be within the scope of this disclosure. Further, in some aspects, the battery 302 may comprise super capacitors, ultra-capacitors etc.

To allow for charge control of the battery 302, the battery charger circuit 304 comprises a charging circuit 308 including a pull-up switch 309, and a discharging circuit 310 including a pull-down switch 313a. A pin corresponding to a power supply node (PMID) is coupled between the charging circuit 308 and the discharging circuit 310, and is configured to supply power to various components of the portable electronic device. A coupling circuit 311, which includes a coupling switch 311a, is disposed between the PMID node 323 and the battery 302. In some aspects, such as in the illustrated embodiment, the pull-up switch 309, pull-down switch 313a, and coupling switch 311a can each be implemented as a transistor, such as a metal-oxide-semiconductor field effect transistor (MOSFET), junction field effect transistor (JFET), fin field effect transistor (FinFET), bipolar junction transistor (BJT), or other switching device. The pull-up switch 309 has a first source/drain coupled to the battery charger adapter port 322, a second source/drain coupled to the power supply node (PMID) 323, and a gate coupled to a battery charge control circuit 314. The pull-down switch 313a has a first source/drain coupled to the power supply node (PMID) through a sink resistor 313b, a second source/drain coupled to circuit ground 324, and a gate coupled to the battery charge control circuit 314. In some aspects, the sink resistor 313b can be an external resistor, a discrete resistor or an internal programmable resistor. In some aspects, the sink resistor 313b is configured to dissipate power due to the discharge of the battery 302. The coupling switch 311a has a first source/drain coupled to the power supply node (PMID), a second source/drain coupled to the battery 302 through a battery pin 321, and a gate coupled to the battery charge control circuit 314.

To control the pull-up switch 309, coupling switch 311a, and pull-down switch 313a; the battery charger circuit 304 includes a battery fault detection circuit 312 and the battery charge control circuit 314. The battery fault detection circuit 312 comprises a battery monitoring circuit 318 configured to monitor one or more battery parameters of the battery 302, and a fault determination circuit 316 configured to determine a battery fault condition, based on the one or more battery parameters.

The battery monitoring circuit 318 comprises a plurality of comparator circuits (e.g., 318a, 318b) that are operably coupled to a fault determination circuit 316. A first voltage comparator circuit 318a is configured to determine whether the battery voltage $V_{BAT}$ is greater than a predefined fault voltage threshold $V_{BATwarm}$, and provide a voltage fault threshold parameter 319a based thereon. A second temperature comparator circuit 318b is configured to determine whether the battery temperature $T_{BAT}$ is greater than a predefined fault temperature threshold $T_{warm}$, and provide a temperature fault threshold parameter 319b based thereon. Each comparator (e.g., the voltage comparator circuit 318a and the temperature comparator circuit 318b) can be an analog comparator that compares two analog signals and provides an analog or digital comparison result, or can be a digital comparator including an ADC that converts an analog parameter from the battery 302 to a digital battery parameter value and then compares that digital battery parameter value to digital threshold value to return a digital comparison result. In some aspects, the battery temperature $T_{BAT}$ exhibits a negative temperature coefficient voltage $V_{TBAT}$ and $V_{Warm}$ is a predefined negative temperature coefficient voltage threshold, which is indicative of the predefined fault temperature threshold Twarm. Therefore, in such aspects, the temperature comparator circuit 318b is configured to determine whether negative temperature coefficient (NTC) voltage $V_{TBAT}$ is less than the negative temperature coefficient (NTC) voltage threshold $V_{Warm}$, in order to determine whether the battery temperature $T_{BAT}$ is greater than the predefined fault temperature threshold Twarm. Alternately, in other aspects, a positive temperature coefficient (PTC) voltage associated with the battery and a predefined PTC voltage threshold may be utilized by the temperature comparator circuit 318b, in order to determine whether the battery temperature $T_{BAT}$ is greater than the predefined fault temperature threshold Twarm. In some aspects, the NTC/PTC voltages associated with the battery 302 are realized based on one or more internal resistors on the portable electronic device 300.

The fault determination circuit 316 is operably coupled to the comparator circuits and is configured to determine a battery fault condition, based on the voltage fault threshold parameter 319a and the temperature fault threshold parameter 319b. The fault determination circuit 316 comprises fault determination logic 317, and can also comprise status registers and control registers that are configured to enable communication between the host circuit 306 and the fault determination circuit 316. The fault determination circuit 316 can correspond to an application-specific-integrated-circuit (ASIC) or a microprocessor with instructions executing from memory, such that block 315 can be a standalone chip and/or can be implemented on a chip with other circuits and/or switches within battery charger circuit 304.

In some aspects, upon determining the battery fault condition, the fault determination circuit 316 is configured to provide a fault detection interrupt signal 334 to the host circuit 306. In some aspects, the fault detection interrupt signal 334 is indicative of the battery fault condition. Upon receiving the fault detection interrupt signal 334, the host circuit 306 is configured to generate a discharge activation signal 332, based on a predefined battery charge control algorithm, further details of which are given in an embodiment below. In some aspects, the host circuit 306 comprises a microcontroller (MCU). In some aspects, the host circuit 306 and the battery charger circuit 304 may be on the same chip or integrated circuit (IC). However, in other aspects, both the host circuit 306 and the battery charger circuit 304 may be on separate chips or integrated circuits (ICs).

In response to the discharge activation signal 332, the fault determination circuit 316 is configured to generate the fault indication signal 326. Based on the fault indication signal 326, the battery charge control circuit 314 is then configured to selectively activate the discharging circuit 310 via discharge control signal 328, activate coupling circuit 311 via coupling control signal 329, and deactivate the charging circuit 308 via charging control signal 330, in order to discharge the battery 302. In some aspects, activating the discharging circuit 310 comprises turning on the pull-down switch 313a while the coupling switch 311a is also turned on; and deactivating the charging circuit 308 comprises turning off the pull-up switch 309. Thus, power from the battery 302 discharges through coupling switch 311a and pull-down switch 313a to circuit ground 324. Signal 327 is transmitted between battery charge control circuit 314 and fault determination circuit 316.

Upon activating the discharging circuit 310, the battery fault detection circuit 312 is further configured to continue to monitor one or more battery parameters of the battery 302 to determine whether a fault correction condition occurs. The battery fault correction condition is indicative of a correction of the battery fault condition—for example that the battery voltage associated with the battery 302 has become less than or equal to a predefined safe voltage threshold $V_{BATSafe}$, and/or the battery temperature has become less than or equal to the predefined fault temperature threshold $V_{warm}$. However, in other aspects, the battery fault correction condition may be defined differently. In some embodiments, the predefined safe voltage threshold $V_{BATSafe}$ is same as the predefined fault voltage threshold $V_{BATwarm}$ defined to determine the battery fault condition. However, in other aspects, the predefined safe voltage threshold $V_{BATSafe}$ and the predefined fault voltage threshold $V_{BATWarm}$ may be different (e.g., the predefined safe voltage threshold $V_{BATSafe}$ is less than the predefined fault voltage threshold $V_{BATwarm}$).

In this example aspect, the battery monitoring circuit 318 further comprises a voltage correction comparator circuit 318c configured to determine whether the battery voltage $V_{BAT}$ associated with the battery 302 is less than the predefined safe voltage threshold $V_{BATSafe}$ and provide a voltage correction threshold parameter 319c based thereon, wherein the voltage correction threshold parameter 319c is indicative of the determination of the battery fault correction condition. In this example, the battery monitoring circuit 318 is shown to include a separate voltage correction comparator circuit 318c that is different from the voltage comparator circuit 318a. However, in other aspects, the same voltage comparator circuit 318a may be reconfigured/repurposed to determine the voltage correction threshold parameter 319c. In some aspects, the fault determination circuit 316 is further configured to determine the battery fault correction condition, based on the voltage correction threshold parameter 319c. In this example aspect, the battery monitoring circuit 318 is shown to include only three comparator circuits 318a, 318b and 318c. However, in other aspects, the battery monitoring circuit 318 may include more or less than three comparator circuits, based on the battery fault condition and the battery fault correction condition.

In some aspects, upon determining the battery fault correction condition, the fault determination circuit 316 is configured to provide a fault correction interrupt signal 335 to the host circuit 306. In some aspects, the fault correction interrupt signal 335 is indicative of the battery fault correction condition. Upon receiving the fault correction interrupt signal 335, the host circuit 306 is configured to generate the discharge deactivation signal 336, based on the predefined battery charge control algorithm, further details of which are given in an embodiment below. In some instances, the fault correction interrupt signal 335 may be asserted on the same interrupt line as the fault interrupt signal, but the status registers of the fault determination circuit 316 may have different values to notify the host circuit 306 of whether the battery fault condition or battery fault correction condition has been detected.

In some aspects, the battery charge control circuit 314 is further configured to deactivate the discharging circuit 310 while leaving the coupling circuit 311 activated in response to the discharge deactivation signal 336. Thus, the battery 302 can still provide power to operate other circuitry 305 even in the wake of a battery fault condition and/or battery fault correction condition being detected in some cases. In some aspects, the battery charge control circuit 314 is further configured to reactivate the charging circuit 308, upon receiving the discharge deactivation signal.

In some aspects, a coupling detector 340 provides a signal (HiZ) indicative of whether the power source 121 is connected (e.g., plugged-in) to the battery charger circuit 304 via the battery charger adapter 320. If the power source 121 is connected (e.g., plugged-in) to the battery charger circuit 304 via the battery charger adapter 320, then the HiZ signal is in a first state; while if the power source 121 is disconnected, then the HiZ signal is in a second state. In FIG. 3, the battery charger adapter 320 is illustrated as a Universal Serial Bus (USB) adapter, but other battery charger adapters such as wired or wireless battery chargers are also contemplated as falling within the scope of the present disclosure.

In this configuration, when the coupling detector 340 detects the battery charger adapter 320 is connected to the power source 121 via the battery charger adapter 320, the host circuit 306 can provide control signals that induce the battery charge control circuit 314 to close the pull-up switch 309 and the coupling switch 311a while the pull-down switch 313a is open, subject to any pending battery fault condition. Thus, when the battery charger adapter 320 is connected, the battery 302 can be charging and the various components of the portable electronic device can be powered through power source 121 via the battery charger adapter 320. Further, if the battery 302 is fully charged and the battery charger adapter 320 is connected to the power source 121, the host circuit 306 is configured to provide control signals that induce the battery charge control circuit 314 to leave the pull-up switch 309 closed and to open the coupling switch 311a and the pull-down switch 313a. Thus, under this condition, the battery 302 can be left in its fully charged state, and solely the battery charger adapter 320 can power the various components of the portable electronic device through the PMID node 323. In some aspects, when battery charger circuit 304 is connected to the power source 121 via the battery charger adapter 320, the battery charge control circuit 314 is further configured to discharge the battery 302 when the battery fault condition of the battery 302 is present. For example, the host circuit 306 can induce the battery 302 to discharge through the battery charger adapter 320, or can induce such a discharge by turning on the pull-down switch 313a, for example. Further, when the coupling detector 340 detects the battery charger adapter 320 is disconnected from the power source 121, the host circuit 306 provides control signals to induce battery charge control circuit 314 to close the coupling switch 311a so the battery 302 supplies power to the PMID node 323. Whether the battery charger adapter 320 is connected or disconnected, the battery fault detection circuit 312 can be configured to monitor the battery parameters, such as VBat and VTBAT for example, and can determine the battery fault condition and/or the battery correction fault condition based on the battery parameters.

In some aspects, when the battery charger adapter is disconnected, the fault determination circuit 316 is configured to monitor one or more threshold parameters (e.g., 319a, 319b and 319c) only during predefined monitoring intervals (e.g., 1 out of 10 clock cycles on the host circuit 306), in order to determine the battery fault condition and the battery fault correction condition while in a low-power mode. However, in other aspects, when the battery charger adapter is connected, the fault determination circuit 316 is configured to monitor one or more threshold parameters (e.g., 319a, 319b and 319c) continuously or more regularly than during the low-power mode (e.g., during each clock cycle of the host circuit 306). In some aspects, the fault determination circuit 316 is configured to monitor the one or more threshold parameters, when the host circuit 306 sets a low power pin LP 337 high. In some aspects, the predefined monitoring intervals are defined based on setting the low power pin (LP 337) high. In some aspects, during a high impedance mode (HiZ mode) associated with the battery charger circuit 304, LP 337 is set high for a first predefined interval and the LP 337 is set low for a second predefined interval. In some aspects, the battery charger circuit 304 enters HiZ mode, when the battery charger adapter 320 is plugged into the battery charger adapter port 322. In some aspects, monitoring the one or more threshold parameters (e.g., 319a, 319b and 319c), during predefined monitoring intervals in HiZ mode, in order to determine the battery fault condition and the battery fault correction condition, enables to conserve power during HiZ mode of the battery charger circuit 304. In some aspects, the host circuit 306 is configured to determine whether the battery charger circuit 304 is in HiZ mode and set LP 337 based thereon. In some aspects, the LP 337 is realized as an internal clock within the battery charger circuit 304.

Figure 4:
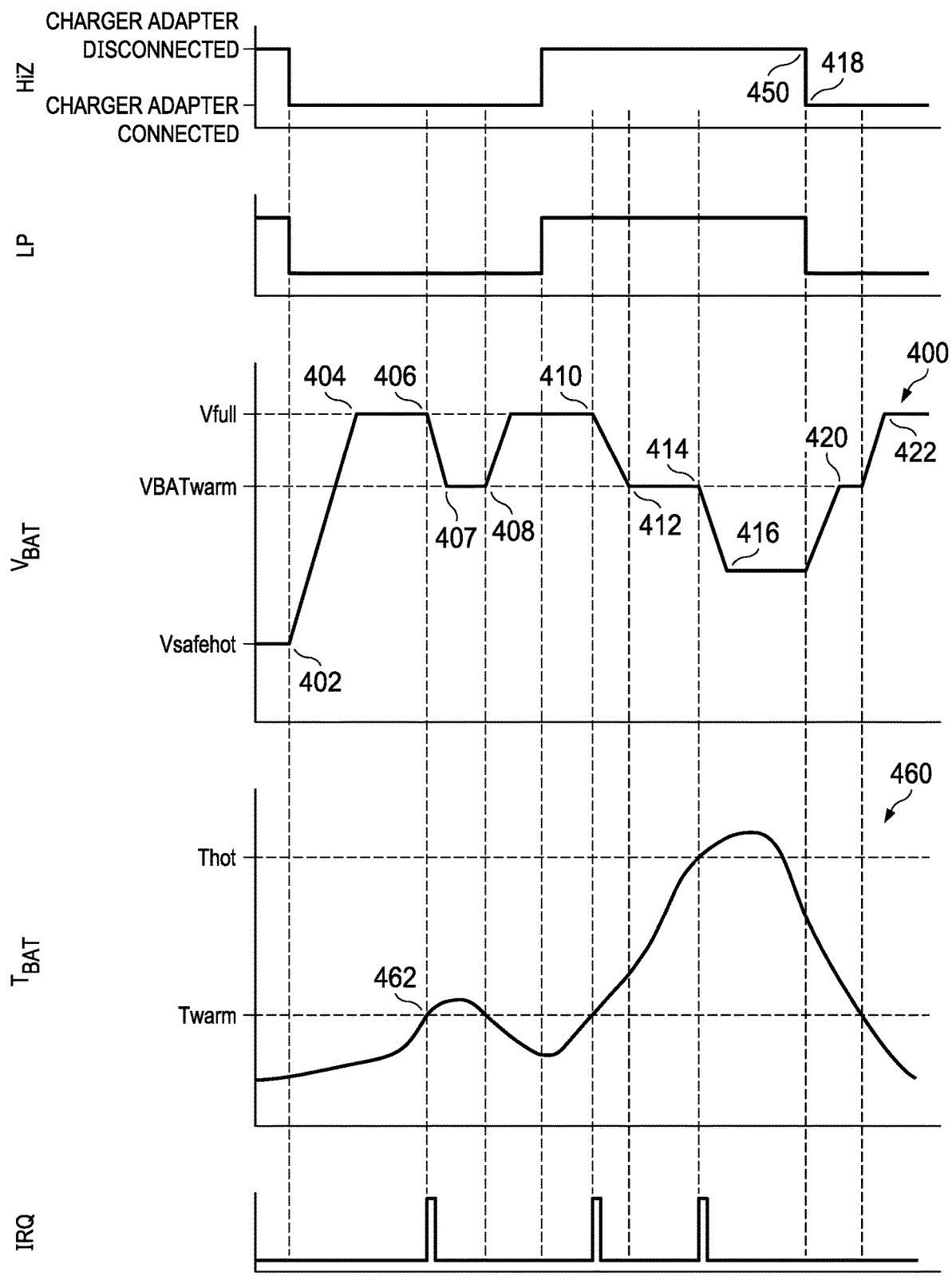
FIG. 4 illustrates an example charging curve associated with a battery, according to one aspect of the disclosure.

FIG. 4 illustrates an example charging curve 400 associated with a battery (e.g., battery 102 in FIG. 1, battery 202 in FIG. 2, battery 302 in FIG. 3), according to one aspect of the disclosure. In this example, the battery is shown to discharge based on two fault conditions and corresponding two fault correction conditions. In particular, a first fault condition comprises a battery voltage $V_{BAT}$ being greater than a safe warm voltage threshold VBATwarm and a battery temperature being greater than Twarm. And a corresponding first fault correction condition comprises the battery voltage $V_{BAT}$ being equal to or less than the safe warm voltage threshold VBATwarm. Further, a second fault condition comprises the battery voltage $V_{BAT}$ being greater than a safe hot voltage threshold Vsafehot and a battery temperature T being greater than Thot. And a corresponding second fault correction condition comprises the battery voltage $V_{BAT}$ being equal to or less than the safe hot voltage threshold Vsafehot. However, in other aspects, the battery fault conditions and the battery fault correction conditions may be defined differently. For example, only one fault condition and a corresponding fault correction condition may be defined in other aspects. Further, FIG. 4 illustrates a charging adapter curve 450 that depicts the timings a battery charger adapter is connected and disconnected to the battery. Furthermore, FIG. 4 illustrates a temperature curve 460 that depicts the variations in temperature of the battery.

At 402, the battery (e.g., the battery 302 in FIG. 3) begins charging by connecting to a battery charger adapter (e.g., the battery charger adapter 320 in FIG. 3). At 404, the battery is charged to Vfull (e.g., a first voltage level). At 406, the first fault condition (e.g., $V_{BAT}$>VBATwarm and T>Twarm) associated with the battery is determined, an interrupt IRQ is generated, and the battery is discharged until the first fault correction condition (e.g., $V_{BAT}$<=VBATwarm) associated with the battery is determined and the discharging of the battery is stopped at 407. As can be seen from the charging adapter curve 450, the battery charger adapter is connected to the battery during the discharge at 406. At 408, the battery is charged again to Vfull as the battery charger adapter is connected. In some aspects, the battery is configured to start charging again at 408 when a charge reactive condition (e.g., T<=Twarm) is determined, and charges until a fully charged voltage is reached.

At 410, the first fault condition (e.g., $V_{BAT}$>VBATwarm and T>Twarm) associated with the battery is determined again, an interrupt IRQ is generated, and the battery is discharged until the first fault correction condition (e.g., $V_{BAT}$<=VBATwarm) associated with the battery is determined and the discharging of the battery is stopped at 412. As can be seen from the charging adapter curve 450, the battery charger adapter is disconnected during the discharge at 410. At 414, the second fault condition (e.g., $V_{BAT}$>Vsafehot and T>Thot) associated with the battery is determined and the battery is discharged. At 416, the second fault correction condition (e.g., $V_{BAT}$<=Vsafehot) associated with the battery is determined and the discharging of the battery is stopped. In some aspects, the battery may be completely isolated from the battery charger circuit (e.g., the battery charger circuit 304 in FIG. 3) at 416, until the battery temperature $T_{BAT}$ goes below Thot. In some aspects, the battery is completely isolated, in order to protect the battery during very high temperature conditions (e.g., T>Thot). In some aspects, the battery is completely isolated by shutting down the battery charger circuit. In some aspects, shutting down the battery charger circuit comprises shutting down the power to a PMID pin associated with the battery charger circuit. At 418, the battery charger adapter is re-connected, and the battery is again charged until 420, when the battery voltage reaches the VBATwarm threshold and the battery temperature is above the Twarm temperature. When the battery then cools to a battery temperature below Twarm, battery charging continues at 422 until the fully charge voltage is reached when charging again stops. The charging curve 400 may be different in different aspects, based on the battery fault conditions and the battery fault correction conditions defined, and is not to be construed to be limiting.

Figure 5:
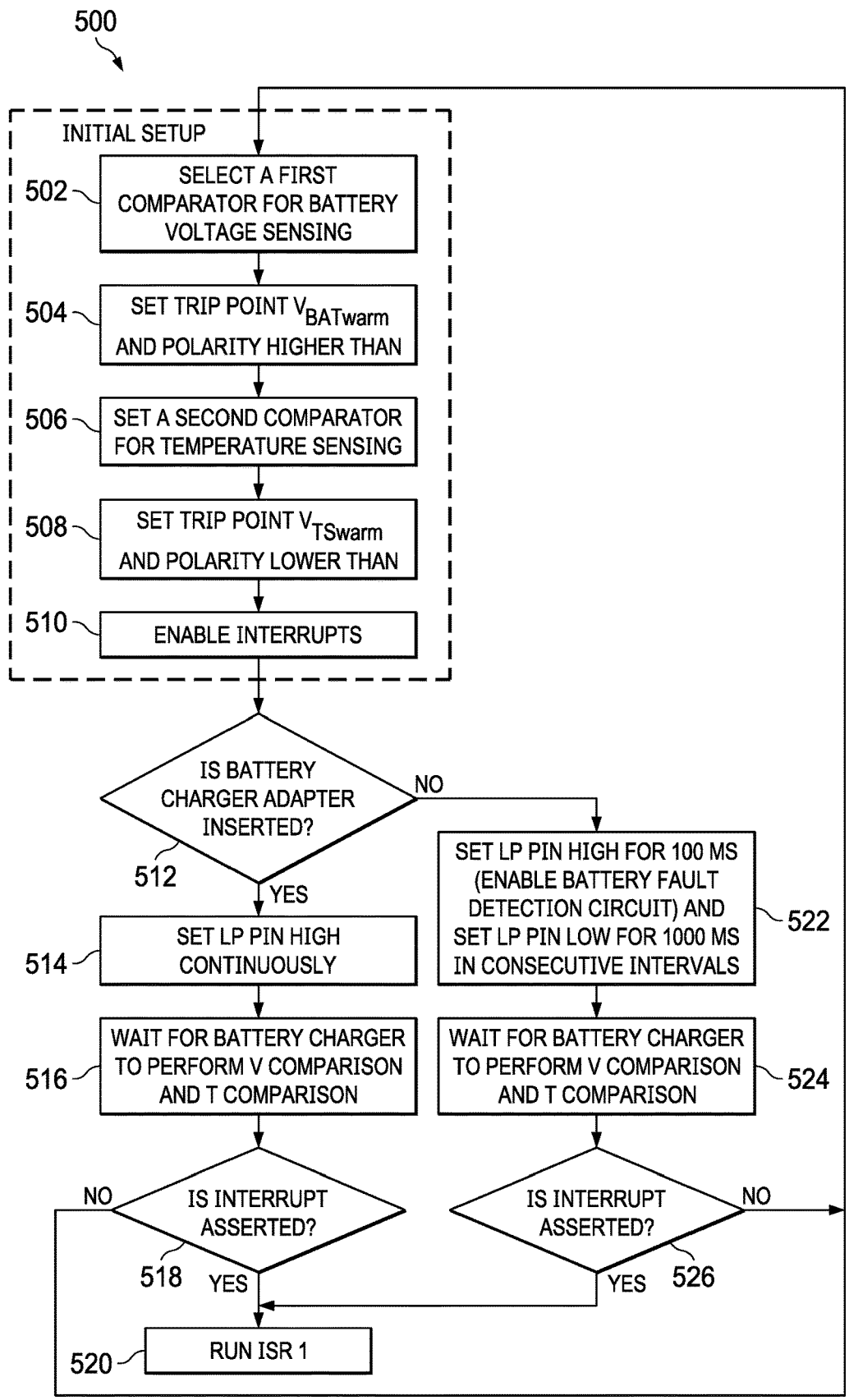
FIG. 5 illustrates an example battery charge control algorithm, according to one aspect of this disclosure.

FIG. 5 illustrates an example battery charge control algorithm 500, according to one aspect of this disclosure. In some aspects, the battery charge control algorithm 500 may be implemented within the host circuit (e.g., host circuit 206 in FIG. 2 or host circuit 306 in FIG. 3). Therefore, the algorithm is explained herein with reference to the portable electronic device 300 in FIG. 3 as an example. The battery charge control algorithm 500 defined herein is specific to the battery fault condition and the battery fault correction condition explained above with respect to FIG. 3. However, in other aspects, the battery charge control algorithm 500 may be defined differently, based on the battery fault condition and the battery fault correction condition. In some aspects, the host circuit (e.g., the host circuit 306 in FIG. 3) may be adapted to configure a battery charger circuit (e.g., the battery charger circuit 304 in FIG. 3), based on the battery charge control algorithm 500, in order to facilitate the discharge of a battery, when a battery fault condition is determined.

At 502, a first comparator register is selected for voltage sensing. In some aspects, selecting the first comparator register comprises configuring/setting a register within the battery charger circuit 304 (e.g., the status registers within the fault determination circuit 316) for storing the output of a first comparator (e.g., the voltage comparator circuit 318a in FIG. 3). At 504, a trip point for the first comparator is set to be $V_{BAT} > V_{BATWarm}$. In some embodiments, setting the trip point comprises storing the trip point condition (e.g., $V_{BAT} > V_{BATWarm}$) within a memory associated with the battery charger circuit (e.g., within the fault determination circuit 316 in FIG. 3). At 506, a second comparator register is selected for temperature sensing. In some aspects, selecting the second comparator register comprises configuring/setting a register within the battery charger circuit (e.g., the status registers within the fault determination circuit 316) for storing the output of a second comparator (e.g., the temperature comparator circuit 318b in FIG. 4). At 508, a trip point for the second comparator is set to be $V_{TBAT} < V_{Warm}$. In some embodiments, setting the trip point comprises storing the trip point condition (e.g., $V_{TBAT} < V_{Warm}$) within a memory associated with the battery charger circuit (e.g., within the fault determination circuit 316 in FIG. 3).

At 510, interrupts are enabled. In some aspects, enabling interrupts comprises setting registers within the battery charger circuit (e.g., within the fault determination circuit 316 in FIG. 3) as interrupt flag registers. In some aspects, the interrupt flag registers within the battery charger circuit are set, in order to assert an interrupt (e.g., the fault detection interrupt signal 334 in FIG. 3). At 512, a determination whether the battery charger adapter (e.g., the battery charger adapter 320 in FIG. 3) is connected to the battery charger circuit or not is made. If yes at 512, the algorithm proceeds to 514, where a low power pin (LP) associated with the battery charger circuit is set high continuously. In some aspects, setting the LP pin high enables the fault detection circuit to be active, in order to determine the battery fault condition. Upon setting the LP pin high, at 516, the host circuit waits for the battery charger circuit to detect the battery fault condition (or assert an interrupt based thereon).

At 518, a determination whether the interrupt is asserted or not is made within the host circuit. In some aspects, the determination whether the interrupt is asserted or not is made based on reading the corresponding interrupt flag registers. If yes at 518, the algorithm proceeds to 520, where the interrupt service routine (ISR) 1 is executed. If No at 518, the algorithm proceeds to 502 and the algorithm is repeated. Referring back to act 512, if No at 512, the algorithm proceeds to 522, where the LP pin associated with the battery charger circuit is set high for 100 ms (or a predefined time interval, in other aspects) and the LP pin is set low for 1000 ms (or a predefined time interval in other aspects) in consecutive intervals. In some aspects, setting the LP pin low (which in turn makes the fault detection circuit inactive), enables to conserve power when the battery charger adapter is disconnected. At 524, the host circuit waits for the battery charger circuit to detect the battery fault condition (or assert an interrupt based thereon). At 526, a determination whether the interrupt is asserted or not is made within the host circuit. If yes at 526, the algorithm proceeds to 520, where the ISR1 is executed. If No at 526, the algorithm proceeds to 502 and the algorithm is repeated.

Figure 6:
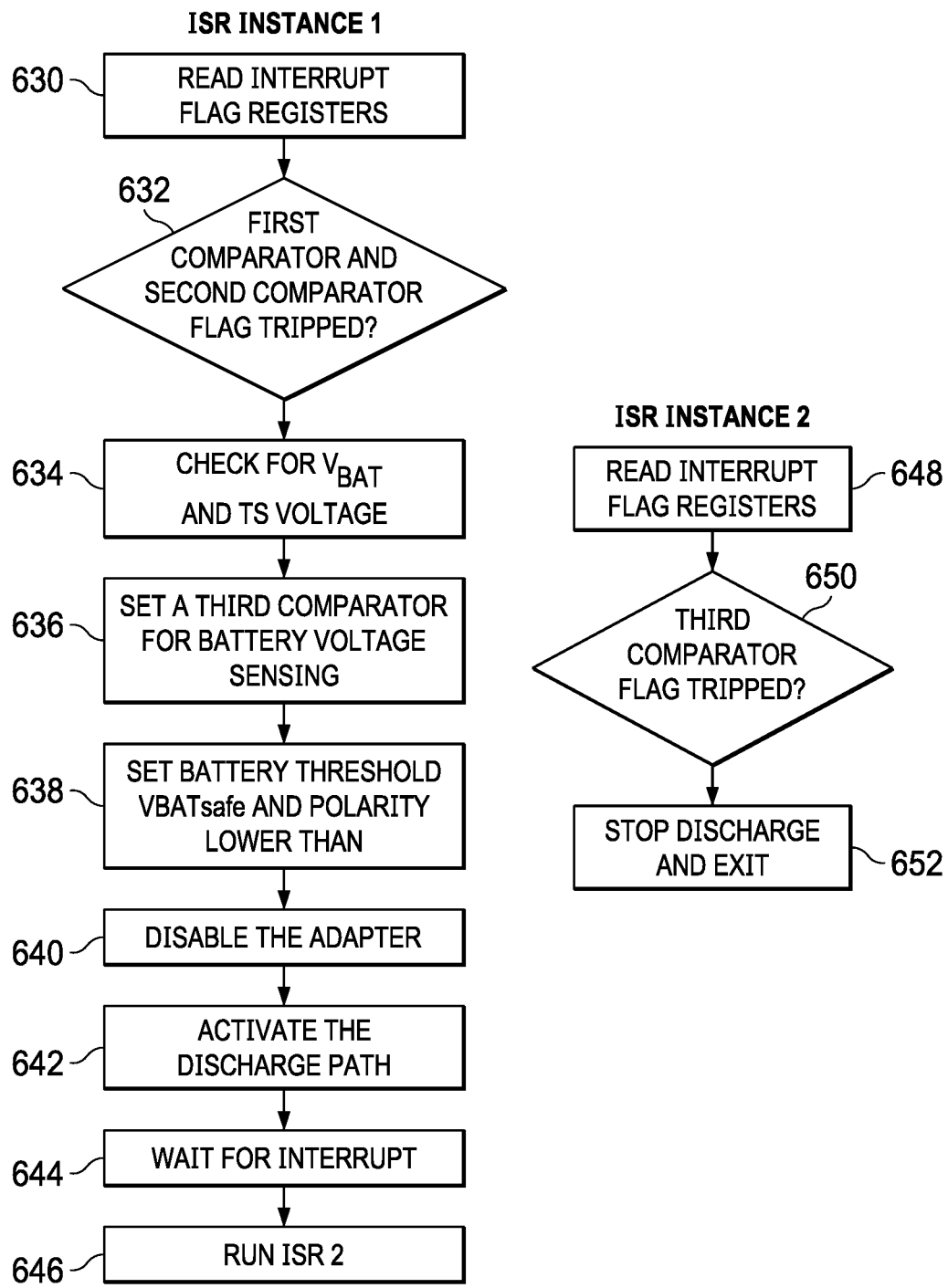
FIG. 6 illustrates an example battery charge control algorithm, according to one aspect of this disclosure.

At 520, the algorithm proceeds to 630 of FIG. 6, where the interrupt flag registers associated with the battery charger circuit are read by the host circuit. At 632, a determination whether the first comparator and the second comparator are tripped is made, based on reading the first comparator register and the second comparator register. If tripped, the algorithm proceeds to 634, where the battery voltage and battery temperature is checked by the host circuit. At 636, a third comparator register is selected for voltage sensing. In some aspects, selecting the third comparator register comprises configuring/setting a register within the battery charger circuit (e.g., the status registers within the fault determination circuit 316) for storing the output of the third comparator (e.g., the voltage comparator circuit 318c in FIG. 3). At 638, a trip point for the third comparator is set to be $V_{BAT} < V_{BATsafe}$. In some embodiments, setting the trip point comprises storing the trip point condition (e.g., $V_{BAT} < V_{BATsafe}$) within a memory associated with the battery charger circuit (e.g., within the fault determination circuit 316 in FIG. 3). At 640, the battery charger adapter is disabled. In some aspects, disabling the battery charger adapter comprises deactivating a charging circuit (e.g., the charging circuit 308 in FIG. 3) associated with the battery charger circuit. At 642, the discharge path (or discharge circuit) associated with the battery charger circuit is activated, in order to discharge the battery. In some aspects, the host circuit is configured to provide a discharge activation signal (e.g., the discharge activation signal 332 in FIG. 3), in order to activate the discharge circuit and deactivate the charging circuit. At 644, an interrupt is waited for.

Upon activating the discharge path, at 646, the host circuit waits for the interrupt (e.g., the fault correction interrupt signal 334 in FIG. 3). In some aspects, the interrupt at 646 provides an indication that the third comparator is tripped. Upon receiving the interrupt, the algorithm proceeds to 646, where the ISR 2 is executed. At 646, the algorithm proceeds to 648, where the interrupt flag registers associated with the battery charger circuit are read by the host circuit. At 650, a determination whether the third comparator is tripped is made, based on reading the third comparator register. If tripped, the algorithm proceeds to 652, where the discharge is stopped. In some aspects, stopping the discharge comprises deactivating the discharge path associated with the battery charger circuit. In some aspects, the host circuit is configured to provide a discharge deactivation signal (e.g., the discharge deactivation signal 336 in FIG. 3) to the battery charger circuit, in order to deactivate the discharge path.

Figure 7:
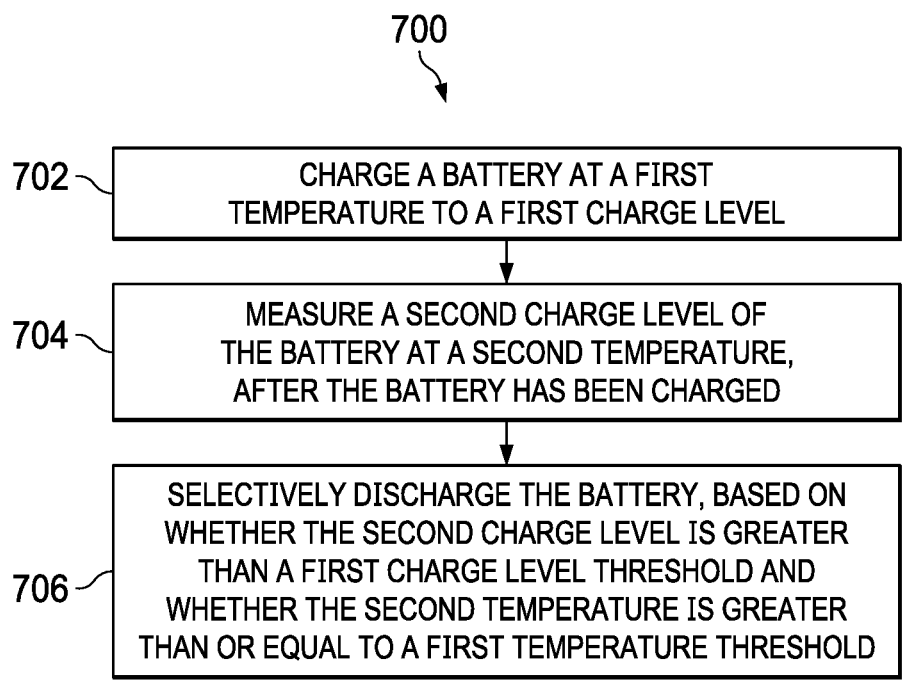
FIG. 7 illustrates a flow chart of a method for charging a battery, according to one aspect of the disclosure.

FIG. 7 illustrates a flow chart of a method 700 for charging a battery, according to one aspect of the disclosure. The method 700 is explained herein with reference to the portable electronic device 300 in FIG. 3 and the charging curve 400 in FIG. 4. At 702, a battery (e.g., the battery 302 in FIG. 3) is charged to a first charge level (e.g., Vfull at 404 in FIG. 4) at a first temperature. In some aspects, the battery is charged to the first charge level, via a battery charger circuit (e.g., the battery charger circuit 304 in FIG. 3). In some aspects, a charging circuit (e.g., the charging circuit 308 in FIG. 3) associated with the battery charger circuit is activated, in order to charge the battery. At 704, a second charge level (e.g., Vfull at 406 in FIG. 4) of the battery and a temperature associated therewith, forming a second temperature (e.g., Twarm at 462 in FIG. 4), is measured after the battery has been charged to the first charge level. In some embodiments, the second charge level and the second temperature is measured at a battery monitoring circuit (e.g., battery monitoring circuit 318 in FIG. 3).

At 706, the battery is selectively discharged (e.g., discharged form Vfull at 406 to VBATwarm at 408 in FIG. 4), based on a determination whether the second charge level is greater than a first charge level threshold (e.g., VBATwarm at 408 in FIG. 4) and whether the second temperature is greater than or equal to a first temperature threshold (e.g., Twarm at 462 in FIG. 4). In some aspects, the determination whether the second charge level is greater than the first charge level threshold and whether the second temperature is greater than or equal to the first temperature threshold is done at a fault determination circuit (e.g., the fault determination circuit 316 in FIG. 3). In some aspects, the battery is discharged based on activating a discharging circuit (e.g., the discharging circuit 310 in FIG. 3) associated with the battery charging circuit. In some aspects, the battery is discharged until a charge level of the battery is equal to or less than the first charge level threshold. Alternately, in some aspects, the battery is discharged until the charge level of the battery reaches a second charge level threshold (e.g., VBATwarm at 408 in FIG. 4) that is equal to or less than the first charge level threshold. In some aspects, the determination whether the charge level of the battery reached the second charge level threshold that is equal to or less than the first charge level threshold is done at the fault determination circuit. In some aspects, the charging of the battery is suspended during the battery discharge, based on deactivating the charging circuit. In some aspects, the first temperature is less than the second temperature, and the first charge level is greater than the first charge level threshold. In some aspects, the charging of the battery to the first charge level occurs while the battery is connected to a battery charger adapter (e.g., the battery charger adapter 320 in FIG. 3), and the selectively discharging charge from the battery until the charge level of the battery reaches the second charge level threshold occurs while the battery is disconnected from the battery charger adapter. However, in other aspects, the selectively discharging charge from the battery until the charge level of the battery reaches the second charge level threshold may occur while the battery is connected to the battery charger adapter.

As discussed in the various aspects above, the battery charger circuit enables to discharge the battery when a battery fault condition is determined. In some aspects, the discharge mechanism associated with the battery charger circuit enables to protect the battery, when a fault condition occurs (e.g., high temperature), after the battery has been fully charged. In some aspects, the discharging circuit associated with the battery charger circuit facilitates to discharge the battery without utilizing external loads like, turning on display etc. Further, in some aspects, the battery fault detection circuit (comprising one or more fault threshold comparator circuits) associated with the battery charger circuit that is configured determine the battery fault condition allows the determination of the battery fault condition to be offloaded from a host of the portable electronic device to the battery charger circuit, and therefore frees the host for other tasks to thereby enhance the overall performance of the portable electronic device.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases. In some embodiments, the methods illustrated above may be implemented in a computer readable medium using instructions stored in a memory. Many other embodiments and variations are possible within the scope of the claimed disclosure.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

What is claimed is:

1. A battery charger circuit, comprising:
   a charging circuit configured to charge a battery;
   a discharging circuit configured to discharge the battery; and
   a battery fault detection circuit configured to detect a battery fault condition of the battery, based on monitoring one or more battery parameters of the battery; and
   a battery charge control circuit configured to selectively activate the discharging circuit, in order to discharge the battery, and deactivate the charging circuit, in order to suspend charging the battery during the discharge of the battery, after the battery fault condition is detected.

2. The battery charger circuit of claim 1, wherein the battery fault condition is detected based on whether a battery temperature associated with the battery is greater than a predefined fault temperature threshold and a battery voltage is greater than a predefined fault voltage threshold.

3. The battery charger circuit of claim 1, wherein:
   upon activating the discharging circuit, the battery fault detection circuit is further configured to:
   determine a battery fault correction condition indicative of a correction of the battery fault condition; and
   the battery charge control circuit is further configured to deactivate the discharging circuit, after the battery fault correction condition is detected.

4. The battery charger circuit of claim 3, wherein the battery fault detection circuit comprises:

a battery monitoring circuit comprising one or more fault threshold comparator circuits configured to respectively provide one or more fault threshold parameters, based on comparing a respective battery parameter to a respective predefined fault threshold, wherein the one or more fault threshold parameters is indicative of the battery fault condition; and a fault determination circuit configured to determine the battery fault condition, based on the one or more fault threshold parameters.

5. The battery charger circuit of claim 4, wherein the battery monitoring circuit further comprises one or more fault correction comparator circuits configured to respectively provide one or more fault correction threshold parameters, based on comparing a respective battery parameter to a respective predefined fault correction threshold, wherein the one or more fault correction threshold parameters is indicative of the battery fault correction condition.

6. The battery charger circuit of claim 3, wherein the battery fault condition comprises a battery temperature associated with the battery being greater than a predefined fault temperature threshold and a battery voltage being greater than a predefined fault voltage threshold.

7. The battery charger circuit of claim 6, wherein the battery fault correction condition comprises the battery voltage being less than or equal to a predefined safe voltage threshold.

8. The battery charger circuit of claim 1, wherein, upon detecting the battery fault condition, the battery fault detection circuit is further configured to:
provide a fault detection interrupt signal to a host circuit, wherein the fault detection interrupt signal is indicative of the battery fault condition;
receive a discharge activation signal from the host circuit, in response to the fault detection interrupt signal; and
generate a discharge control signal to activate the discharging circuit, the discharge control signal being based on the discharge activation signal.

9. A portable electronic device, comprising:
a battery; and
a battery charger circuit, comprising:
a charging circuit configured to charge the battery, wherein the charging circuit comprises a pull-up transistor having a first source/drain coupled to a battery charger adapter port and a second source/drain coupled to the battery;
a discharging circuit configured to discharge the battery, wherein the discharging circuit comprises a pull-down transistor having a first source/drain coupled to the battery and a second source/drain coupled to a circuit ground;
a battery fault detection circuit configured to detect a battery fault condition of the battery, based on monitoring a battery voltage and a battery temperature associated with the battery; and
a battery charge control circuit configured to selectively discharge the battery via the discharging circuit, based on whether the battery fault condition is detected.

10. The portable electronic device of claim 9:
wherein the battery fault detection circuit is further configured to determine a battery fault correction condition indicative of a correction of the battery fault condition, based on the battery voltage; and
wherein the battery charge control circuit is configured to stop discharging the battery based on the battery fault correction condition.

11. The portable electronic device of claim 10, further comprising:
a coupling transistor having a first source/drain coupled to the second source/drain of the pull-up transistor and having a second source/drain coupled to the battery, wherein the coupling transistor is coupled between the pull-up transistor and the battery such that the second source/drain of the pull-up transistor is coupled to the battery through the coupling transistor.

12. The portable electronic device of claim 10, further comprising: a sink resistor coupled between the second source/drain of the pull-up transistor and the first source/drain of the pull-down transistor, the sink resistor configured to dissipate power due to the discharge of the battery.

13. The portable electronic device of claim 10, wherein the battery fault condition is detected based on whether the battery temperature is greater than a predefined fault temperature threshold and the battery voltage is greater than a predefined fault voltage threshold.

14. The portable electronic device of claim 13, wherein the battery fault correction condition is detected based on whether the battery voltage is less than or equal to a predefined safe voltage threshold.

15. The portable electronic device of claim 14, wherein the battery fault detection circuit comprises a battery monitoring circuit comprising:
a temperature comparator circuit configured to determine whether the battery temperature is greater than the predefined fault temperature threshold, and provide a temperature fault threshold parameter based thereon, wherein the temperature fault threshold parameter is indicative of the detection of the battery fault condition; and
a voltage comparator circuit configured to determine whether the battery voltage is greater than the predefined fault voltage threshold, and provide a voltage fault threshold parameter, wherein the voltage fault threshold parameter is indicative of the detection of the battery fault condition.

16. The portable electronic device of claim 15, wherein the battery fault detection circuit comprises further comprises a fault determination logic configured to determine the battery fault condition, based on the temperature fault threshold parameter and the voltage fault threshold parameter.

17. The portable electronic device of claim 16, wherein the battery monitoring circuit further comprises a voltage correction comparator circuit configured to determine whether the battery voltage is less than or equal to the predefined safe voltage threshold and provide a voltage correction threshold parameter based thereon, wherein the voltage correction threshold parameter is indicative of the determination of the battery fault correction condition.

18. The portable electronic device of claim 10, further comprising a host circuit configured to:
receive a fault detection interrupt signal from the battery fault detection circuit, when the battery fault condition is determined at the battery fault detection circuit, wherein the fault detection interrupt signal is indicative of the battery fault condition; and
provide a discharge activation signal to the battery fault detection circuit, in response to the fault detection interrupt signal, to induce the discharging circuit to discharge the battery.

19. The portable electronic device of claim 18, wherein the host circuit is further configured to:

receive a fault correction interrupt signal from the battery fault detection circuit, when the battery fault correction condition is determined at the battery fault detection circuit, wherein the fault correction interrupt signal is indicative of the battery fault correction condition; and provide a discharge deactivation signal to the battery fault detection circuit, in response to the fault correction interrupt signal, to induce the discharging circuit to stop discharging the battery.

20. A method for controlling a charge level of a battery, comprising:

using a charging circuit to charge the battery at a first temperature to a first charge level;

after the battery has been charged to the first charge level, using a battery monitoring circuit to measure a second charge level of the battery and a temperature associated therewith as a second temperature;

using a fault determination circuit to make a determination whether the second charge level is greater than a first charge level threshold and whether the second temperature is greater than or equal to a first temperature threshold; and based on the determination, using a discharging circuit to selectively discharge the battery while charging of the battery is suspended.

21. The method of claim 20, wherein the charging of the battery to the first charge level occurs while the battery is connected to a battery charger adapter, and wherein the selectively discharging of the battery occurs while the battery is disconnected from the battery charger adapter.

22. The method of claim 20, wherein the first temperature is less than the second temperature, and the first charge level is greater than the first charge level threshold.

23. The method of claim 20, wherein the battery is selectively discharged using the discharging circuit until a charge level of the battery is equal to or less than the first charge level threshold.

* * * * *